United States Patent [19]
Jones

[11] Patent Number: 5,547,485
[45] Date of Patent: Aug. 20, 1996

[54] PARISON TRANSFER MECHANISM

[75] Inventor: Stanley P. Jones, Doncaster, United Kingdom

[73] Assignee: Emhart Glass Machinery Investments Inc., Wilmington, Del.

[21] Appl. No.: 223,966

[22] Filed: Apr. 6, 1994

[30]     Foreign Application Priority Data

Apr. 13, 1993 [GB] United Kingdom ............... 9307532

[51] Int. Cl.⁶ ................................................ C03B 9/44
[52] U.S. Cl. ............................. 65/260; 65/235; 65/241
[58] Field of Search ........................... 65/235, 241, 260

[56]     References Cited

U.S. PATENT DOCUMENTS 2,151,876   3/1939   Wadman ............................... 65/235

Primary Examiner—Donald E. Czaja
Assistant Examiner—Steven P. Griffin
Attorney, Agent, or Firm—Spencer T. Smith

[57]     ABSTRACT

A parison transfer mechanism comprises two neck-ring arms which are mounted for rotation about a horizontal axis, which axis is inclined to a central axis of a section in which the mechanism is mounted. This allows for several arrangements of pairs of such mechanisms in a section so that the two mechanisms can operate independently of each other.

4 Claims, 4 Drawing Sheets

PARISON TRANSFER MECHANISM

This invention is concerned with a transfer mechanism for transferring and inverting parisons in a section of a glassware forming machine from a blank station where the parisons are formed in a parison mould to a second forming station where the parison is blown to form a container in a blow mould.

BACKGROUND TO THE INVENTION

A conventional I.S. glass container forming machine comprises a series of sections arranged along side each other and operating out of phase with each other. Each section is equipped with a single parison transfer mechanism carrying one or more neck-rings. Taking single gob operation as an example, the machine cycle commences with the neck-ring in a reverted position and the parison mould closed around it. A charge of glass enters the upper end of the parison mould and is blown or pressed into a parison shape with some glass being forced into the space between the neck-ring and a plunger to form a finish end of the final container. The parison mould then opens leaving the parison held by its finish end in the neck-ring. The invert mechanism then operates to carry the parison from the parison forming station and to invert it into the blow mould station where the blow mould closes around it. The neck-ring is then opened, dropping the parison into the blow mould where it is supported by a bead formed on the finish. The invert mechanism returns the neck-ring to the parison forming station and the parison mould closes around it ready for the next charge of glass. Meanwhile the parison hanging in the blow mould is blown into the final container.

Various steps have been taken in recent years to increase the speed of the container forming process e.g. by the introduction of axial mould cooling methods and the reduction in the wall thickness of the finished container. However, the thickness of the glass in the finish has not been reduced to the same extent and in lightweight containers today the thickest glass is often to be found here. As machine speeds have increased, the time available for the forming and cooling of the glass in the finish has become disproportionately reduced. This is a particular problem when the parison is formed by a plunger in a press process, for the neck-ring is the last part of the parison mould equipment to be filled with glass. The result is that the glass in the finish is not cool enough, and thus not hard enough to maintain its shape accurately when the parison is transferred to the blow mould, leading to subsequent distortion and loss of ware. Further reduction in the weight of the finish is limited because, should the distance between the neck-ring and the plunger inside it become too small it is not possible to force glass into the neck-ring and containers are formed with incomplete finishes.

One method available to reduce this problem is to apply more cooling to the neck-ring. This is only partially effective because, if the neck-ring becomes too cold, defects are formed in the container finish. Also because of the very low thermal conductivity of the glass a cooler neck-ring does not take out appreciably more heat from the glass. A more effective solution to the problem would be to increase the time of contact between the finish of the container and the neck-ring but this is not possible with a single neck-ring per blank mould without slowing down the machine cycle which is commercially unacceptable.

The provision of two sets of neck-rings for each parison mould will overcome the problem described above, and has other benefits. The parison would be made and inverted in the normal way but instead of being dropped into the blow mould when the neck-rings open, the neck-rings would remain closed during at least part of the blowing operation. The extra time available for contact between the glass finish and the neck-rings would extend to almost a complete machine cycle if required. More time would also be available for forming the parison, for next cycle would not have to wait for the neck-rings to invert, open and return. Instead, an empty set of neck-rings would be available to move into position as soon as the filled neck-rings had left. Additionally, the speed of invert could be beneficially reduced, for the inverting set of neck-rings would not be required to be back in the reverted position as quickly as possible ready for the next cycle.

Several attempts have been made to devise ways of providing two sets of neck-rings on an individual section glass container forming machine. The main difficulty is interference between the set of neck-rings carrying the parison to the blow mould and the other, empty, set of neck-rings returning to the parison forming position.

One suggestion is made in U.S. Pat. No. 4,162,911, in which two sets of neck-ring mechanisms are provided one on either side of a parison mould assembly, and operate alternately to transfer parisons outwards to two blow mould assemblies also on opposite sides of the parison mould assembly. Such an arrangement leads to a machine wherein the sections have to be arranged transversely next to each other rather than parallel to each other, with consequent problems of space and glass supply.

U.S. Pat. No. 3,434,820 describes a machine in which a chain carrying a series of neck-rings travels in a vertical loop thus holding returning neck-rings clear of ones carrying glass. Such an arrangement is only usable in a machine in which the parison is formed in an upright rather than an inverted position.

U.S. Pat. No. 4,058,388 describes a machine with two neck-rings mounted on racks in which interference is avoided by sliding the two mechanisms horizontally parallel to the centre line of the section. Such an arrangement is mechanically complex and essentially requires a considerable width of the section.

It is one of the objects of the present invention to provide a parison transfer mechanism which enables two sets of neck-rings to be provided in a conventional I.S. Section to work in co-operation with one set of parison moulds.

SUMMARY OF THE INVENTION

The present invention provides, in one of its aspects a parison transfer mechanism for use in an individual section glassware forming machine comprising a supporting member for mounting in the machine, two neck-ring arms mounted for rotation in the supporting member about a horizontal axis, means for moving the neck-ring arms towards and away from each other between open and closed positions, a plurality of neck-ring supports in each neck-ring arm such that when the arms are in their closed position a plurality of neck-ring supporting apertures are provided having parallel axes which are aligned in a plane, wherein the plane in which the axes of the supporting apertures lie is inclined to the axis about which the neck-ring arms rotate.

The present invention provides, in another of its aspects a section of an individual section glassware forming machine comprising a parison mould assembly comprising one or more parison moulds in which a gob of glass may be formed into a parison said mould or moulds being positioned on a center axis of the section, two blow mould assemblies each comprising a number of blow moulds correspnding to the number of said parison moulds, the two blow mould assemblies being spaced transversely apart across the center axis of the section, means for transferring parisons from the parison moulds to the blow moulds comprising two parison transfer mechanisms, one transfer mechanism transferring parisons from the parison moulds to one of the blow mould assemblies and the other transfer mechanism transferring parisons from the parison moulds to the other blow mould assembly, the said parison transfer mechanism being mounted in the section spaced transversely apart across the center axis of the section, each parison transfer mechanism comprising a supporting member, two neck-ring arms mounted for rotation in the supporting member about a horizontal axis between a first, parison engaging, position and a second, parison releasing, position, each neck-ring arm comprising a number of neck-ring supports corresponding to the number of parison moulds means for moving the neck-ring arms towards and away from each other between an open condition and a closed condition in which the neck-ring supports of the neck-ring arms provide a number of neck-ring supporting apertures corresponding to the number of parison moulds, and each of the transfer mechanisms being so arranged that its said horizontal axis is inclined to the center axis of the section.

The present invention also provides, in yet another of its aspects a section of an individual section glassware forming machine comprising a parison mould assembly comprising one or more parison moulds positioned on the center axis of the section, two parison transfer mechanisms arranged on opposite sides of the center axis and each comprising
a supporting member,
two neck-ring arms,
means for rotating the neck-ring arms about a horizontal invert axis,
means for moving the neck-ring arms towards and away from each other between an open and a closed position,
means for rotating the mechanism about a vertical axis wherein the operation of the section each transfer mechanism is caused to operate in turn to carry parisons from the parison mould assembly to the blow mould assembly by rotation of the neck-ring arms about the horizontal invert axis through approximately 180° while the transfer mechanism rotates about its vertical axis.

The present invention also provides in one of its aspects a section of an individual section glassware forming machine comprising a parison mould assembly comprising one or more parison moulds in which a gob of glass may be formed into a parison, said mould or moulds being positioned on a centre axis of the section, a blow mould assembly comprising a number of blow moulds corresponding to the number of said parison moulds which blow moulds are positioned on the center axis of the section, means for transferring parisons from the parison mould or moulds to the blow mould or moulds comprising two parison transfer mechanisms, arranged on opposite sides of the center axis of the section, each parison transfer mechanism comprising
a supporting member,
two neck-ring arms mounted for rotation in the supporting member about a horizontal invert axis and each comprising a number of neck-ring supports corresponding to the number of parison moulds,
means for rotating said neck ring-arms about the invert axis through approximately 180° to carry the neck supports between a first position adjacent the parison moulds and a second position adjacent the blow moulds,
means for moving the neck-ring arms towards and away from each other between an open condition and a closed condition in which the neck-ring supports provide a number of neck-ring supporting apertures corresponding to the number of parison moulds,
and means for rotating the mechanism about a vertical axis wherein in the operation of the section each transfer mechanism is caused to rotate about said vertical axis in one direction when the neck-ring arms are being rotated about the invert axis to carry the neck supports from their first position to their second position, and in the opposite direction when the neck-ring arms are returning to their first position, the two transfer mechanisms operating out of phase with each other.

The present invention will become more clear from the following description, to be read with reference to the accompanying drawings, of a parison transfer mechanism embodying the invention and of four section arrangements incorporating two such parison transfer mechanisms.

BRIEF DESCRIPTION OF THE DRAWINGS

In the accompanying drawings

DETAILED DESCRIPTION OF THE INVENTION

Figure 1:
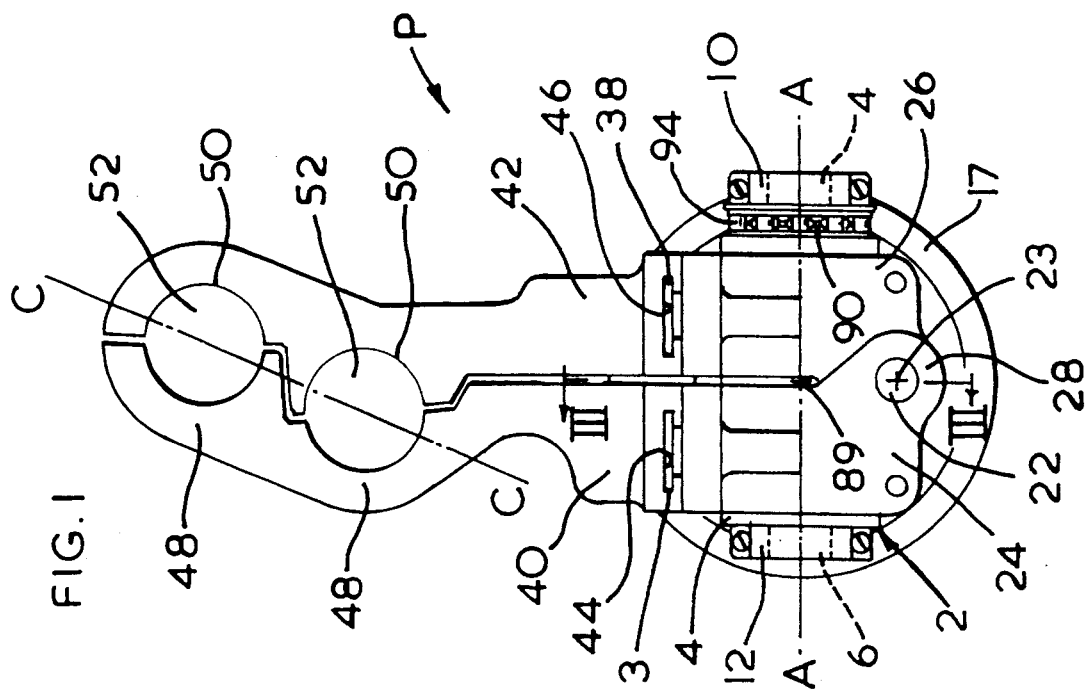
FIG. 1 shows a plan view of a parison transfer mechanism embodying the invention

A parison transfer mechanism P is shown in FIG. 1 and is intended for use in an individual section glassware forming machine. Such machines comprise a parison mould assembly comprising one or more parison moulds in which a gob of glass may be formed into a parison and a blow mould assembly (or sometimes two blow mould assemblies) comprising a corresponding number of blow moulds in which a parison may be blown into a container, and means for transferring parisons from the parison moulds to the blow moulds. Such means usually transfers the parisons directly to the blow moulds, but sometimes the parisons are transferred to an intermediate, reheat, station from which they are then transferred to the blow moulds.

Figure 4:
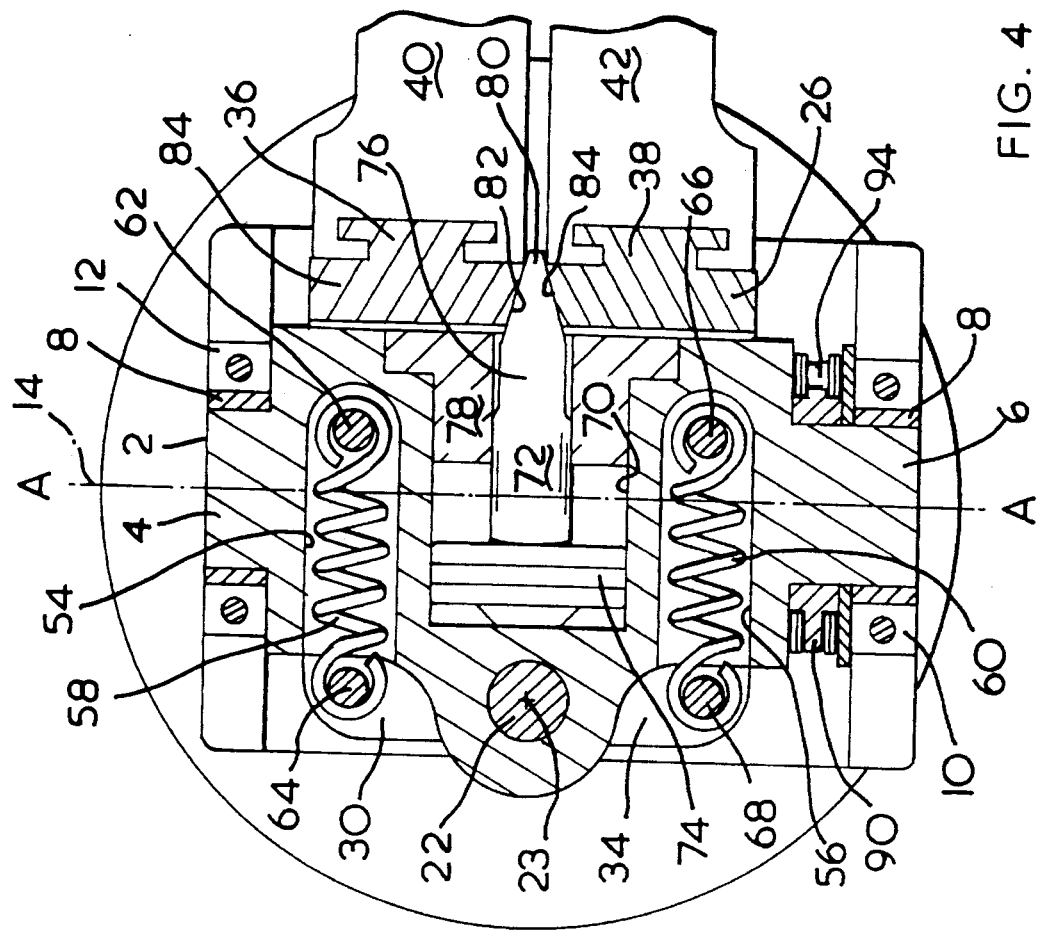
FIG. 4 shows a view in section along the line IV—IV of FIG. 2.

The parison transfer mechanism P comprises a supporting member in the form of a block 2 comprising opposed circular trunnions 4,6 which are supported in bearings 8 in brackets 10,12 so that the block 2 can be rotated about a horizontal invert axis 14 (shown by A—A in FIGS. 1 and 4.) between invert and revert positions.

Figure 2:
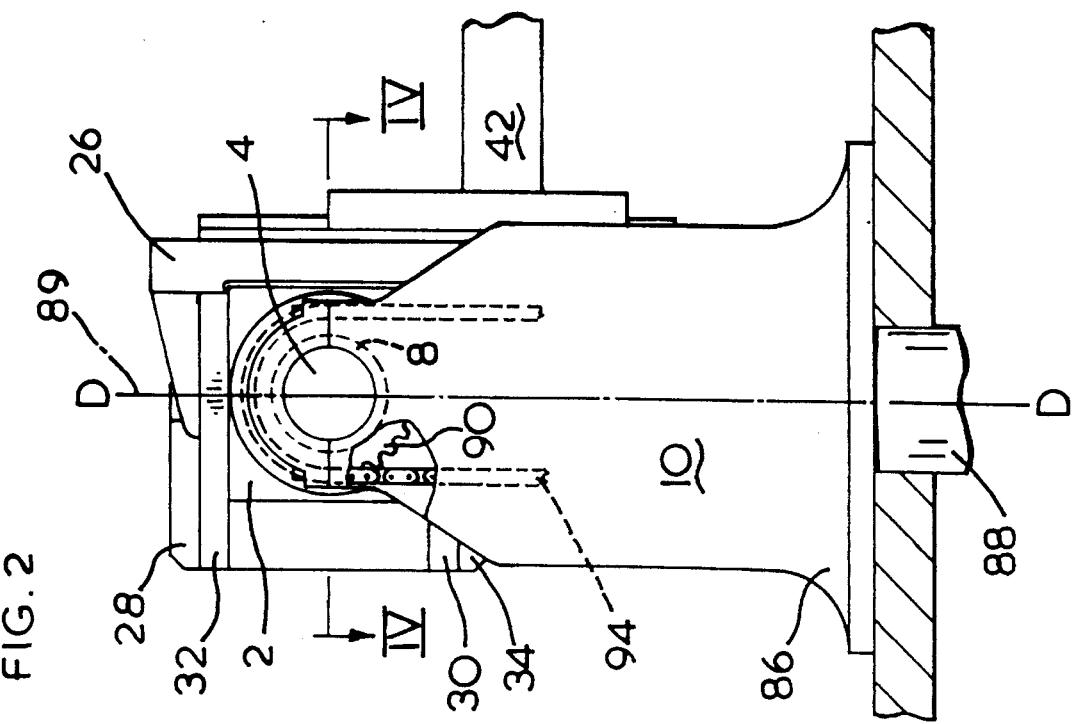
FIG. 2 shows a side view of FIG. 1
Figure 3:
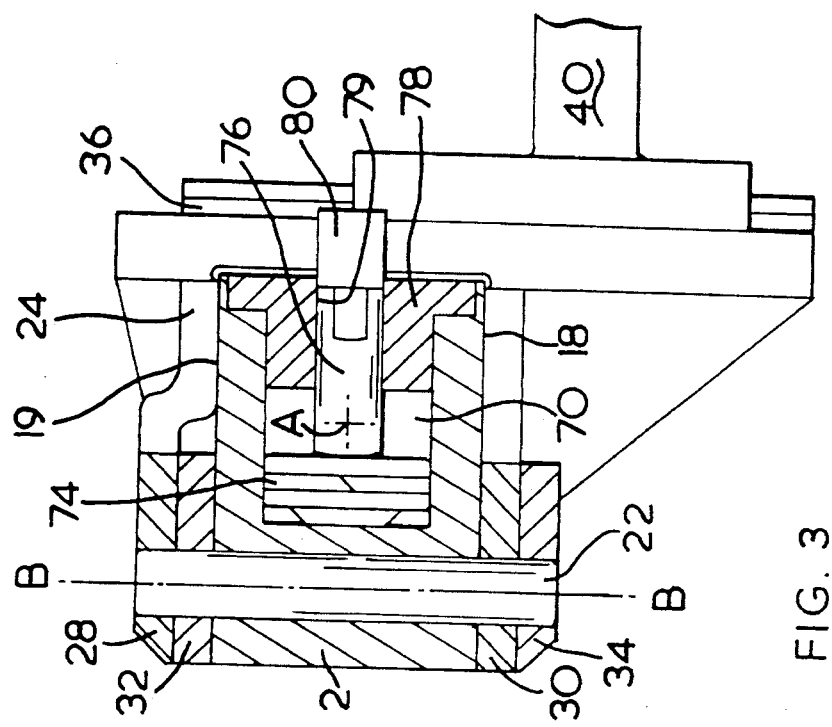
FIG. 3 shows a view in section along the line III—III of FIG. 1

When the block 2 is in a first revert, position, (as shown in FIGS. 2 and 3) a plane lower face 18 and a plane upper face 19 of the block 2 are horizontal.

The block 2 supports a shaft 22 whose axis 23 (shown as B—B in FIG. 3) is perpendicular to the face 18 and is thus vertical when the block 2 is in its revert position.

The transfer mechanism P comprises two neck-ring supporting members 24, 26 which are mounted on the shaft 22 for angular movement about the axis 23. The member 24 comprises lugs 28 and 30, and the member 26 lugs 32 and 34 by which they are supported on the shaft 22, the lugs 30 and 32 being located against the plane faces 18 and 19 of the block 2 and the lugs 28 and 34 lying respectively against and outside the lugs 32 and 30.

The supporting members 24,26 each comprise a tongued locating member 36,38 respectively. Neck-ring arms 40,42 having locating T slots 44,46 respectively are positioned on the members 36,38 and clamped in position at the desired height.

The neck-ring arm 40 comprises two semicircular neck-ring supports 48,48 and the neck-ring arm 42 two similar neck-ring supports 50,50. When the neck-ring arms are in a closed condition, as shown in FIG. 1 two neck-ring supporting apertures 52,52 are provided. It will be understood that, according to the configuration of the machine in which the transfer mechanism is to be used, the neck-ring arms 40 may comprise one or a plurality of neck-ring supports.

If there is more than one neck-ring support, axes of the neck-ring apertures lie in a plane (C—C in FIG. 1) and as can be seen this plane is inclined at an angle, specifically in the illustrated mechanism 67.50°, to the axis A—A about which the neck-ring arms 40,42 rotate.

The mechanism comprises means for moving the neck-ring arms 40,42 towards and away from each other between open and closed conditions. The block 2 comprises two bores 54,56 and strong tension springs 58,60 extend respectively between a pin 62 in the bore 54 and a pin 64 secured between the lugs 28 and 30 and between a pin 66 in the bore 56 and a pin 68 secured between the lugs 32 and 34. As can be seen from FIG. 4 these springs 58,60 act to urge the neck-ring arms 40–42 into their closed condition.

In a central bore 70 of the block 2 is mounted a piston 72 comprising a head 74 and a piston rod 76. The bore 70 is closed by a bushing 78 having a central bore 79 through which the rod 76 passes. The rod 76 comprises a tapered end portion 80 which engages cam faces 82,84 on the supporting member 24,26.

Air under pressure is supplied to the bore 70 on both sides of the piston head 74 through bores (not shown) in the block 2.

It can be seen that when compressed air is supplied to the left hand portion of the bore 70 (viewing FIGS. 3 and 4) the piston 72 is forced outwardly and the end portion 80 bearing against the cam faces 82 and 84 forces the supporting members 24,26 and thus the neck-ring arms 40,42 apart from their closed condition into an open condition against the action of the springs 58 and 60. Reversal of the compressed air supply withdraws the piston 72 and the springs 58 and 60 act to return the neck-ring arms 40,42 into their closed condition.

The brackets 10 and 12 are integral with a base 86 which rests against a top plate 17 of the machine and is attached to a vertical shaft 88 which is rotatably mounted in the machine about a vertical axis 89 (shown as D—D in FIG. 2).

Secured to the trunnion 4 between the bracket 10 and the block 2 is a chain wheel 90 which is driven by a chain 94.

Movement of the chain 94 thus rotates the neck-ring arms 40 and 42 about the axis A—A. between revert and invert positions.

The parison transfer mechanism P can be incorporated in a section of a glassware forming machine in several different arrangements.

Figure 5:
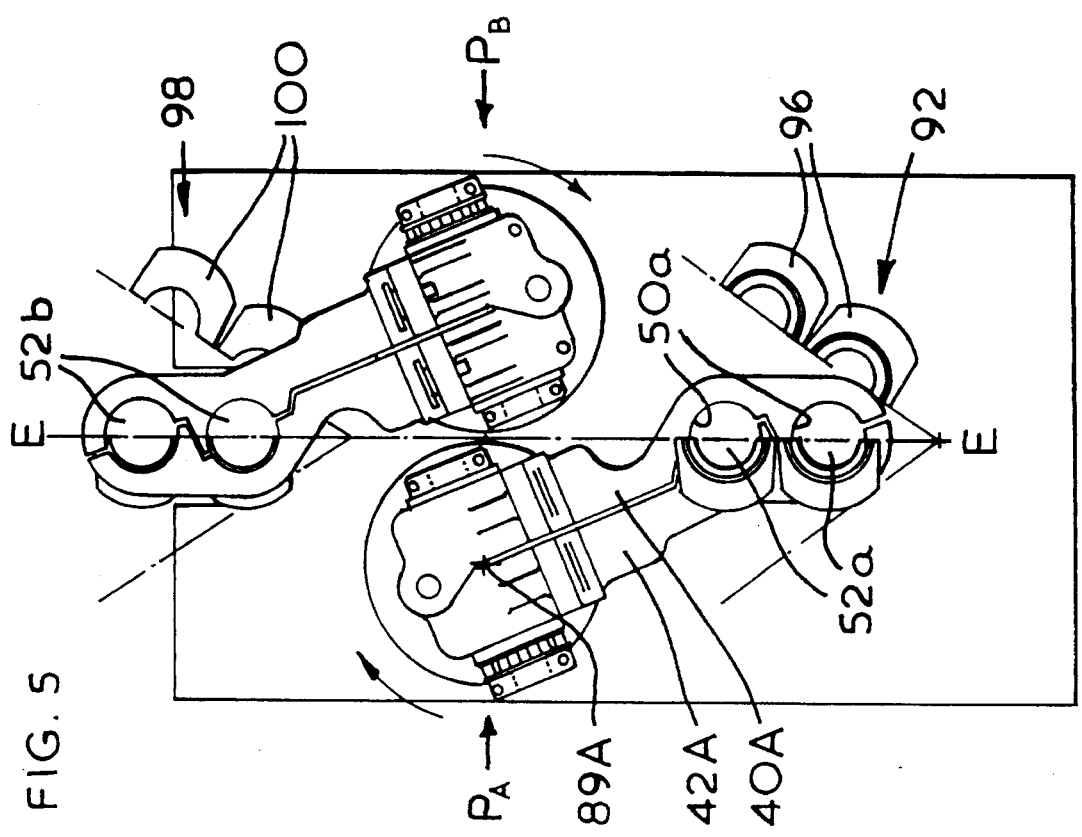
FIG. 5 shows a diagrammatic plan view of a first section embodying the invention

A first arrangement is shown diagrammatically in plan in FIG. 5. This shows a section of an individual section glassware forming machine comprising a double gob parison mould assembly 92 comprising two parison moulds 96 (for clarity two half parison moulds are shown in their open positions) and a blow mould assembly 98 correspondingly comprising two blow moulds 100 (again two half blow moulds are shown in their open position) in which a formed parison may be blown into a container. As can be seen the blow moulds 100 and the parison moulds 96 are, when in their closed position, aligned along a centre axis E—E of the section.

In the first arrangement two parison transfer mechanisms $P_A$ and $P_B$ are arranged on opposite sides of the centre axis E—E. In the operation of the section, the mechanism $P_A$ starts in a first position as shown, its neck-ring arms in a first, parison engaging position with the neck-ring supporting apertures 52*a* in their revert position aligned with and below parison moulds 96 which are in their closed position. Gobs of glass are then supplied to the parison moulds 96 and formed into parisons in a conventional manner by use of a baffle and plunger mechanism (not shown). The parison moulds 96 are then opened, leaving the parisons supported by their neck portions in the neck-ring supports 50*a* of the transfer mechanism $P_A$.

The horizontal axis A—A of the mechanism $P_A$ is, at this stage, inclined to the centre axis of the section at an angle of about 67½°. The mechanism $P_A$ then moves to a second position by a combination of two movements—firstly a rotation of the neck-ring arms 40A 42A through approximately 180° about the horizontal axis A—A from their revert to their invert position and secondly a simultaneous clockwise rotation of the mechanism through about 45° about its vertical axis 89A. By appropriate timing of these rotations the neck-ring arms are kept in their movement within the boundaries of the section (indicated by boundary lines in FIG. 5). It will be seen that when the mechanism $P_A$ has rotated approximately 22½° about its vertical axis (clockwise as viewed in FIG. 5) the mechanisms and the parisons it carries are completely to the left of the centre axis of the section. These rotations bring the neck-ring arms into a second, parison releasing position with the neck-ring supporting apertures in their invert position in alignment with the blow moulds 100, which are open; the blow moulds then close around the parisons, the parisons are blown and the neck-ring arms are then moved apart to release the blown containers.

While this movement of the transfer P mechanism $P_A$ is taking place, a reverse movement of the mechanism $P_B$ is effected, by a combined clockwise rotation through 45° about its vertical axis with a simultaneous rotation of the neck-ring arms from their invert to their revert positions through 180° about the horizontal axis. This brings the neck-ring supporting apertures 52b,52b of the mechanism Pb into position at the parison mould station for the parison moulds to close over them ready for the formation of the next pair of parisons. Opening and closing movement of the neck-ring arms is co-ordinated with the operation of the transfer mechanism as will be understood.

It will be seen that when the mechanism $P_B$ has rotated approximately 22½° about its vertical axis (clockwise as viewed in FIG. 5) the mechanism is completely to the right of the centre axis of the section, and thus by appropriate timing, movement of the mechanism $P_A$ and $P_B$ can occur simultaneously without interference with each other.

Figure 6:
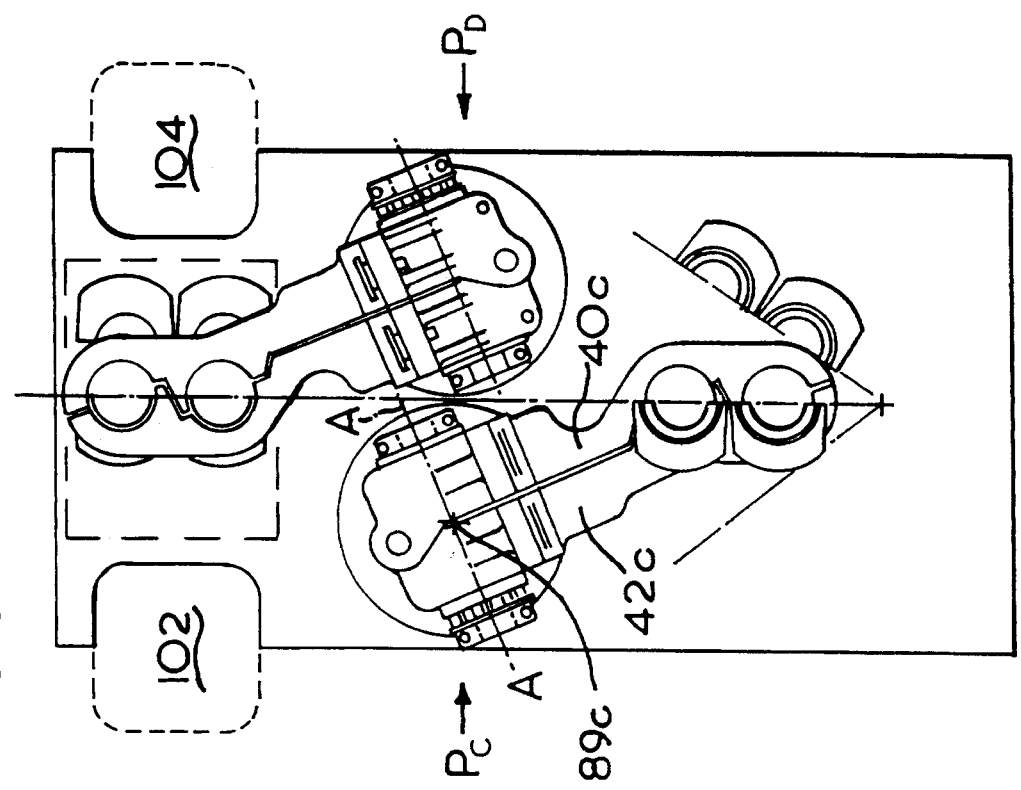
FIG. 6 shows a diagrammatic plan view of a second section embodying the invention

A second arrangement of a section is shown in FIG. 6. This is in general similar to the first arrangement comprising two transverse mechanisms $P_C$ and $P_D$, save that the blow mould assembly comprises parallel opening moulds rather than arcuately opening moulds as is provided in the first arrangement. A parallel mould assembly occupies slightly less space than an arcuate assembly: the second arrangement is provided with two cullet chutes 102, 104, each extending partway into the adjoining sections. In normal operation the second arrangement operates in just the same way as the first arrangement, but if it is required to reject a parison held in the transfer mechanism $P_C$, the mechanism may be caused to rotate the neck-ring arms 40c, 42c about the horizontal axis A—A, without causing simultaneous rotation about the vertical axis 89c. This brings the parisons held in the neck-ring apertures over the cullet chute 102 into which, on opening the neck-ring arms 40c, 42c, the parisons may be dropped.

This is very convenient when starting the section up: initial parisons introduced into a blow mould on setting up a section are too cold to blow properly and normally have to be removed from the machine manually. The arrangement of FIG. 6 allows the parisons to be rejected automatically until they reach the necessary temperature at which time the section reverts to normal operation as described with reference to FIG. 5.

Figure 7:
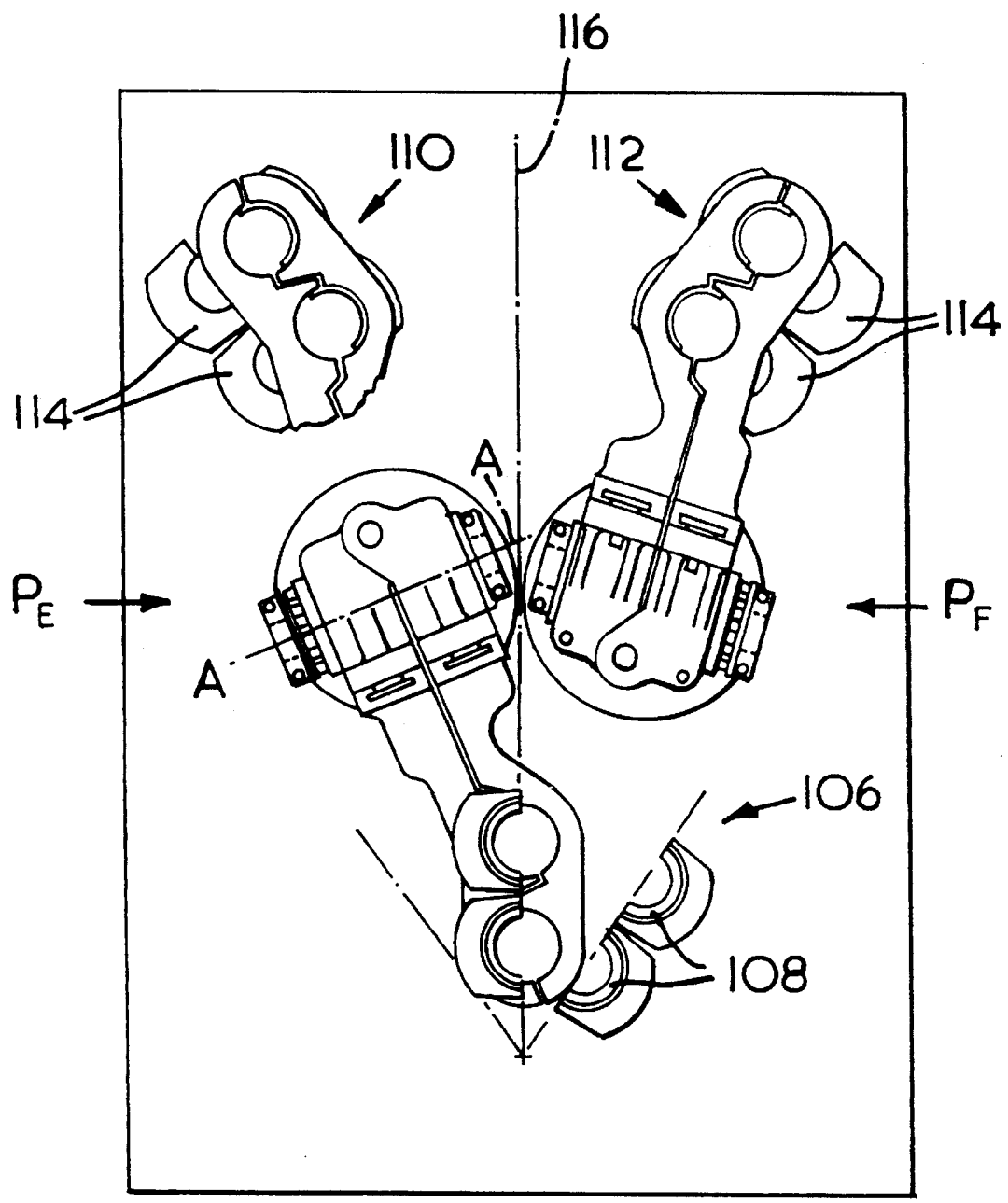
FIG. 7 shows a diagrammatic plan view of a third section embodying the invention

FIG. 7 shows a third arrangement of a section of a double gob glassware forming machine.

This section comprises a parison mould assembly 106 (one half of which is shown in an open position) comprising two parison moulds 108 in which a gob of glass may be formed into a parison, two blow mould assemblies 110,112 each correspondingly comprising two blow moulds 114 in which a formed parison may be blown into a container, the blow mould assemblies 110,112 being symmetrically positioned transversely apart across a centre line 116 of the section.

The third arrangement comprises two parison transfer mechanisms $P_E$ and $P_F$, $P_E$ transferring parisons to the blow mould assembly 110, $P_F$ to the assembly 112. The parison transfer mechanisms $P_E$ and $P_F$ are mounted spaced transversely apart across the axis of the section, and are constituted as the transfer mechanism P save that they are not mounted for rotation about a vertical axis. As can be seen the horizontal axes of rotation of the neck-ring arms of the two mechanisms $P_E$ and $P_F$ are inclined to the centre axis of the section.

In the operation of this arrangement the parison transfer mechanisms operate alternately, by movement of their neck-ring arms 180° about their horizontal axes, to transfer formed parisons to the blow moulds, the mechanism $P_E$ transferring to the mould assembly 110 and the mechanism $P_F$ to the mould assembly 112.

I claim:

1. A transfer mechanism for transferring parisons formed in a cylindrical blank mold of a section of an I.S. machine to a cylindrical blow mold of the section wherein the vertical axes of the cylindrical blank mold and cylindrical blow mold define a vertical section center plane, comprising:

a first neck ring assembly including first and second neck ring arms for gripping a parison formed in the blank mold, first means for mounting said first neck ring assembly for displacement about a horizontal axis so that said first and second neck ring arms with a gripped parison can be pivoted 180° from a first position to a second position, and means for supporting said first means for mounting for displacement about a first vertical axis, a selected transverse distance from one side of said vertical section center plane, from a first orientation to a second orientation, so that the parison will be in the blank mold when said first and second neck ring arms grip the parison at said first position and so that the parison will be in the blow mold when said first and second neck ring arms grip the parison at said second position, said first vertical axis being selectively located so that said first means for mounting will be located on one side of said vertical section center plane as the parison is displaced between said cylindrical blank mold and said cylindrical blow mold.

2. A transfer mechanism according to claim 1, further comprising:

a second neck ring assembly including third and fourth neck ring arms for gripping a parison formed in the blank mold, second means for mounting said second neck ring assembly for displacement about a second horizontal axis so that said third and fourth neck ring arms with a gripped parison can be pivoted 180° from a first position located at said blank mold to a second position located at said blow mold, and means for supporting said second means for mounting for displacement about a second vertical axis, said selected transverse distance from an opposite side of said vertical section center plane from said one side, from a first orientation to a second orientation so that the parison will be at the blank mold when said third and fourth neck ring arms grip the parison at said first position and so that the parison will be at the blow mold when said first and second neck ring arms grip the parison at said second position, said second vertical axis being selectively located so that said second mounting means will be located on one side of said vertical section center plane as the parison is displaced between said cylindrical blank mold and said cylindrical blow mold.

3. A transfer mechanism according to claim 2, wherein the horizontal axis about which said first neck ring assembly is displaceable makes an angle with said vertical center section plane when said first and second neck ring arms grip the parison at the blank or blow molds.

4. A transfer mechanism according to claim 3, wherein the second horizontal axis about which said second neck ring assembly is displaceable makes an angle with said vertical center section plane when said third and fourth neck ring arms grip the parison at the blank or blow molds.

* * * * *